United States Patent
McGrath et al.

(10) Patent No.: US 12,236,285 B2
(45) Date of Patent: Feb. 25, 2025

(54) APPLICATION PROGRAMMING INTERFACE (API) AUTOMATION FRAMEWORK

(71) Applicant: HSBC Technology and Services (USA) Inc., Arlington Heights, IL (US)

(72) Inventors: Frank McGrath, London (GB); Easwaran Neelakandan, East Brunswick, NJ (US); James Golden, Township of Washington, NJ (US); Darren Lowe, Sheffield (GB)

(73) Assignee: HSBC Technology and Services (USA) Inc., Arlington Heights, IL (US)

( * ) Notice: Subject to any disclaimer, the term of this patent is extended or adjusted under 35 U.S.C. 154(b) by 295 days.

(21) Appl. No.: 17/931,202

(22) Filed: Sep. 12, 2022

(65) Prior Publication Data
US 2023/0077995 A1    Mar. 16, 2023

Related U.S. Application Data

(60) Provisional application No. 63/261,240, filed on Sep. 15, 2021.

(51) Int. Cl.
*G06F 9/54*      (2006.01)
*G06F 8/30*      (2018.01)
*G06F 11/3668*   (2025.01)

(52) U.S. Cl.
CPC ............ *G06F 9/54* (2013.01); *G06F 8/31* (2013.01); *G06F 11/3684* (2013.01)

(58) Field of Classification Search
None
See application file for complete search history.

(56) References Cited

U.S. PATENT DOCUMENTS

| | | |
|---|---|---|
| 2010/0251340 A1 | 9/2010 | Martin et al. |
| 2012/0179677 A1 | 7/2012 | Roselli et al. |
| 2016/0124742 A1 | 5/2016 | Rangasamy et al. |

(Continued)

OTHER PUBLICATIONS

PCT International Application No. PCT/US22/76265, International Search Report and Written Opinion of the International Searching Authority, dated Dec. 15, 2022, 11 pages.

(Continued)

*Primary Examiner* — Craig C Dorais
(74) *Attorney, Agent, or Firm* — Norton Rose Fulbright US LLP

(57) ABSTRACT

An automation framework system may include a service portal, an API gateway, an entitlements microservice, and a resources microservice. The service portal is configured to provide access to automation functionality of the automation framework system. The service portal is configured to provide entitlement models for generating a programming interface API or automation. The API gateway is configured to intercept API requests from a client device. The API gateway is configured to grant or reject the API requests based on each requested API and information about a user associated with the client device. The entitlements microservice is configured to determine whether the user of the client device is permitted to access the API based on group information associated with the client device. The resources microservice is configured to manage resources associated with each API request.

20 Claims, 5 Drawing Sheets

(56) References Cited

U.S. PATENT DOCUMENTS

2016/0359861 A1  12/2016  Manov et al.
2020/0183659 A1*  6/2020  Bojara .................. H04L 63/101
2020/0348986 A1*  11/2020  Venkatesh ................. G06F 8/36

OTHER PUBLICATIONS

Zhao, et al., "Management of API gateway based on micro-service architecture," Journal of Physics: Conference Series, vol. 1087, No. 3, IOP Publishing, 2018, 9 pages.

HSBC, "HSBC opens up API suite with new developer portal," https://www.about.us.hsbc.com/news-and-media/hsbc-opens-up-api-suite-with-new-developer-portal#:~:text=HSBC%20has%20launched%20an%20Application,of%20a%20secure%20testing%20environment., Jun. 7, 2021, 1 page.

Oracle, "Introduction to API Gateway OAuth 2.0", Oracle Fusion Middelware, https://docs.oracle.com/cd/E50612_01/doc.11122/oauth_guide/content/oauth_intro.html, printed Nov. 8, 2022, 3 pages.

Hillpot, "What Is API Gateway Authentication?", DreamFactory, https://blog.dreamfactory.com/what-is-api-gateway-authentication/, Oct. 14, 2020, 8 pages.

Siraj, "Securing Microservices: The API gateway, authentication and authorization", SD Times, https://sdtimes.com/apis/securing-microservices-the-api-gateway-authentication-and-authorization/, Sep. 20, 2017, 6 pages.

Software AG, "webMethods API Gateway Documentation", API Gateway 10.5, https://documentation.softwareag.com/webmethods/api_gateway/yai10-5/10-5_API_Gateway_webhelp/index.html#page/api-gateway-integrated-webhelp/gtw_manage_users_groups_profiles.html, 2021, 2 pages.

Amazon Web Services, Inc., "Amazon API Gateway Supports Amazon Cognito OAuth2 Scopes", AWS, https://aws.amazon.com/about-aws/whats-new/2017/12/amazon-api-gateway-supports-amazon-cognito-oauth2-scopes/, Dec. 14, 2017, 3 pages.

* cited by examiner

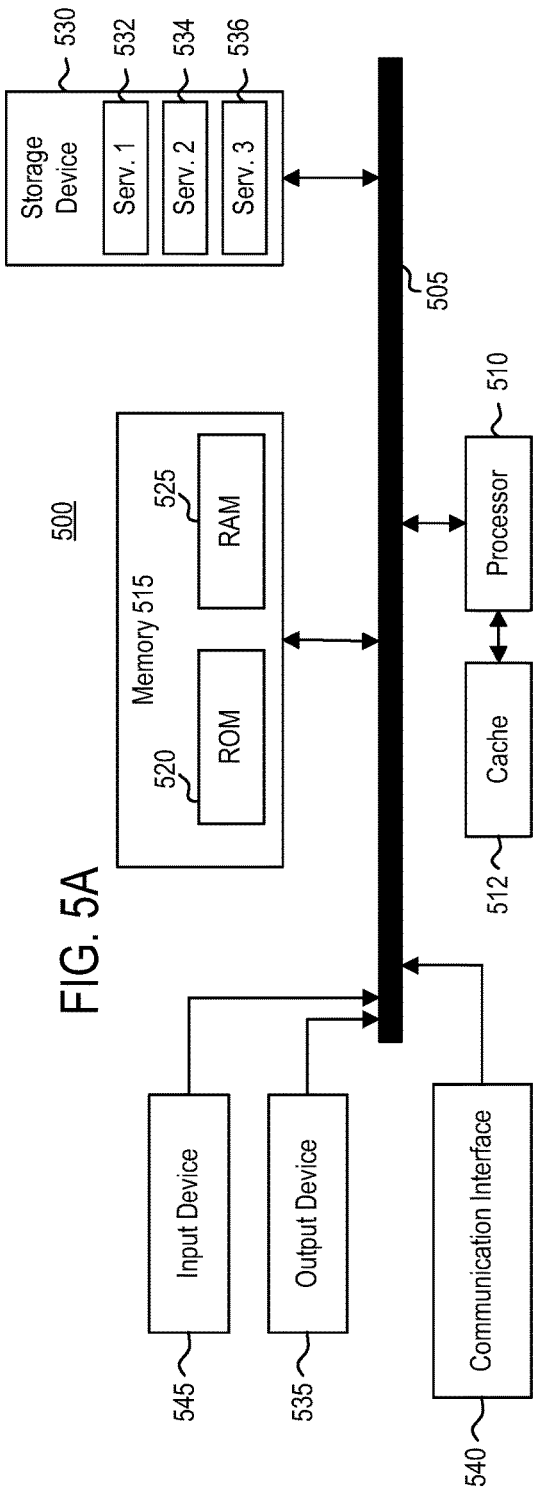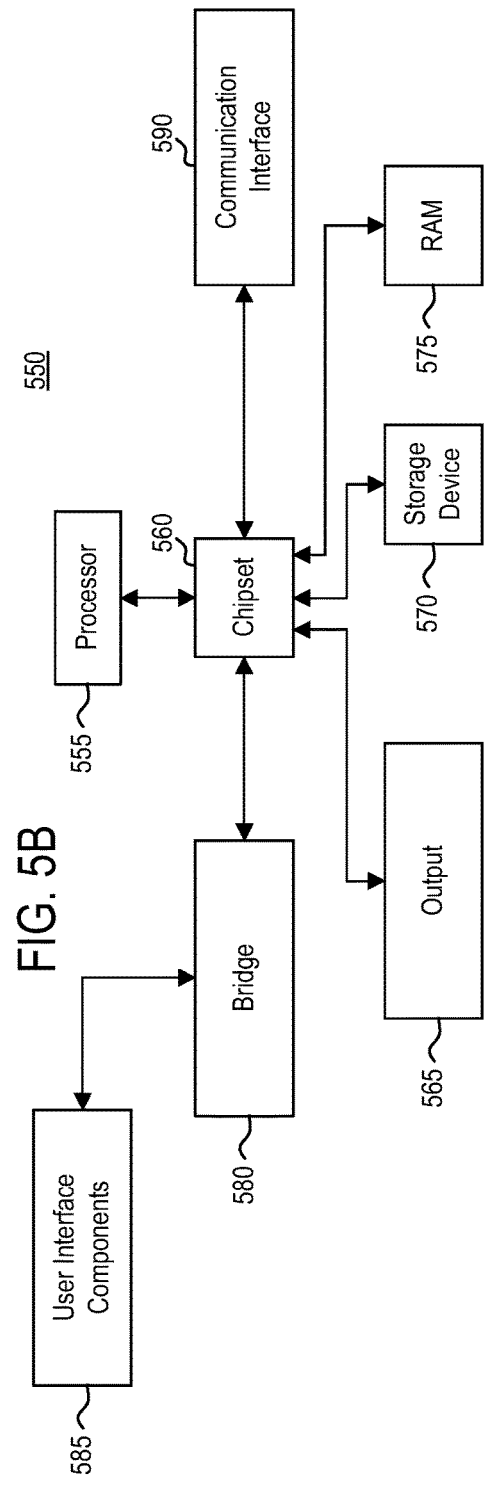

APPLICATION PROGRAMMING INTERFACE (API) AUTOMATION FRAMEWORK

CROSS-REFERENCE TO RELATED APPLICATIONS

This application claims priority to U.S. Provisional Application Ser. No. 63/261,240, filed Sep. 15, 2021, which is hereby incorporated by reference in its entirety.

FIELD OF THE DISCLOSURE

Embodiments disclosed herein generally relate to an automation framework and a method of operating the same.

BACKGROUND

Companies increasingly use a combination of application programming interfaces and automations to drive their various service offerings. While management of application programming interfaces and automations may be manageable for smaller companies with few application programming interfaces and/or automations, when a company tries to scale those application programming interfaces and automations at an enterprise level, many difficulties may occur, as there is not currently a framework that is able to handle development or management of application programming interface and/or automations at this grand scale.

SUMMARY

In some embodiments, an automation framework system is disclosed herein. The automation framework system may include a service portal, an API gateway, an entitlements microservice, and a resources microservice. The service portal is configured to provide access to automation functionality of the automation framework system. The service portal is configured to provide entitlement models for generating a programming interface API or automation. The API gateway is configured to intercept API requests from a client device. The API gateway is configured to grant or reject the API requests based on each requested API and information about a user associated with the client device. The entitlements microservice is configured to determine whether the user of the client device is permitted to access the API based on group information associated with the client device. The resources microservice is configured to manage resources associated with each API request.

In some embodiments, an automation framework system is disclosed herein. The automation framework system may include an API gateway, an entitlements microservice, and a resources microservice. The API gateway is configured to intercept API requests from a client device. The API gateway is configured to grant or reject the API requests based on each requested API and information about a user associated with the client device. The entitlements microservice is configured to determine whether the user of the client device is permitted to access the API based on group information associated with the client device. The resources microservice is configured to manage resources associated with each API request.

In some embodiments, a method is disclosed herein. An API gateway intercepts an API request originating from a client device. The API request includes a token identifier corresponding to a user of the client device and an API identifier associated with an API of the API request. An entitlements microservice determines that the user is in a group of users that is permitted to access the API. The entitlements microservice determines that the user has a role that is permitted to access the API. A resources microservice identifies one or more services associated with the API in the API request. The API gateway grants the user with access to the API.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 5A illustrates an architecture of system bus computing system, according to example embodiments.

FIG. 5B illustrates a computer system having a chipset architecture, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques discussed herein provide an automation framework. The automation framework may provide for a common set of governance and management for application programming interface (API) hosting. The automation framework functionality described below is notable absent from industry tools such as existing API hosting platforms (e.g., MuleSoft®, Kong, etc). Instead, in some embodiments, automation framework may sit on top of these API hosting platforms to enable large scale collaborative development, while ensuring a common entitlements and governance models to enable automated self-service processes, based on industry standards and practices.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described. In some embodiments, a user may be someone that may be affiliated with back end computing system 104 described below.

Figure 1:
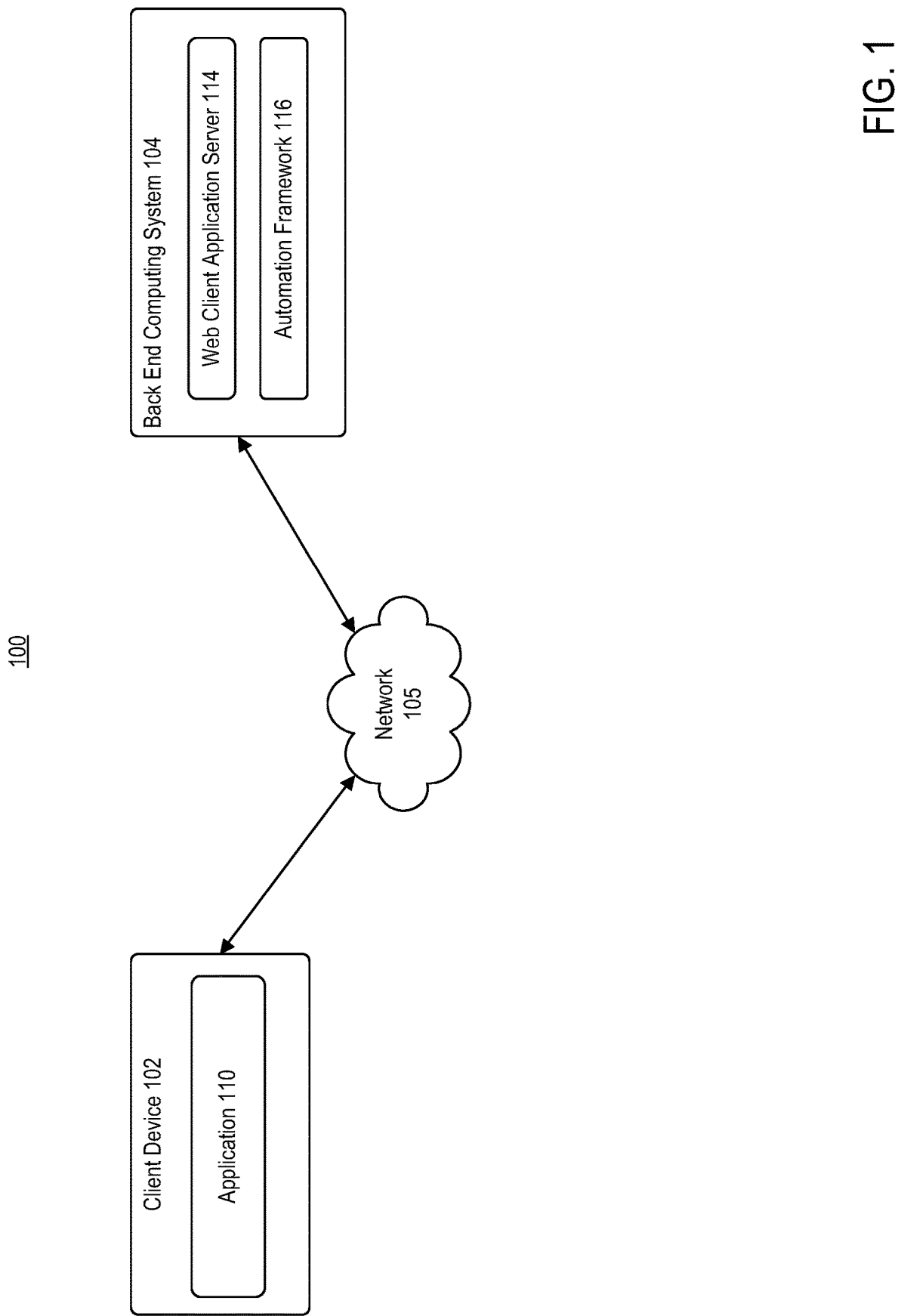
FIG. 1 is a block diagram illustrating a computing environment, according to one exemplary embodiment.

FIG. 1 is a block diagram illustrating a computing environment 100, according to one embodiment. Computing environment 100 may include at least a client device 102 and a back end computing system 104 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of computing environment 100.

Client device 102 may be in communication with back end computing system 104 via network 105. Client device 102 may be operated by a user. For example, client device 012 may be a mobile device, a tablet, a desktop computer, or any computing system having the capabilities described herein. Users may include, but are not limited to, individuals such as, for example, developers or employees of an entity associated with back end computing system 104.

Client device 102 may include at least application 110. Application 110 may be representative of a web browser that allows access to a website or a stand-alone application. Client device 102 may access application 110 to access one or more functionalities of back end computing system 104. Client device 102 may communicate over network 105 to request a webpage, for example, from web client application server 114 of back end computing system 104. For example, client device 102 may be configured to execute application 110 to access functionality of automation framework 116. The content that is displayed to client device 102 may be transmitted from web client application server 114 to client device 102, and subsequently processed by application 110 for display through a graphical user interface (GUI) of client device 102.

Back end computing system 104 may include web client application server 114 and automation framework 116. Automation framework 116 may be configured to provide infrastructure development at scale while ensuring consistency and security throughout the development process. For example, automation framework 116 may provide users with an enterprise-ready solution that integrates one or more third party products for API hosting, orchestration, and identity management. In some embodiments, automation framework 116 may provide easy-to-use connectors or integrations to various management systems. Further, automation framework 116 may easily support various entitlement models associated with back end computing system 104. Accordingly, automation framework 116 may provide users with a plug and play framework for developing APIs and other automations at scale with authentication and customizable authorization, transaction auditing, and change management.

Figure 2:
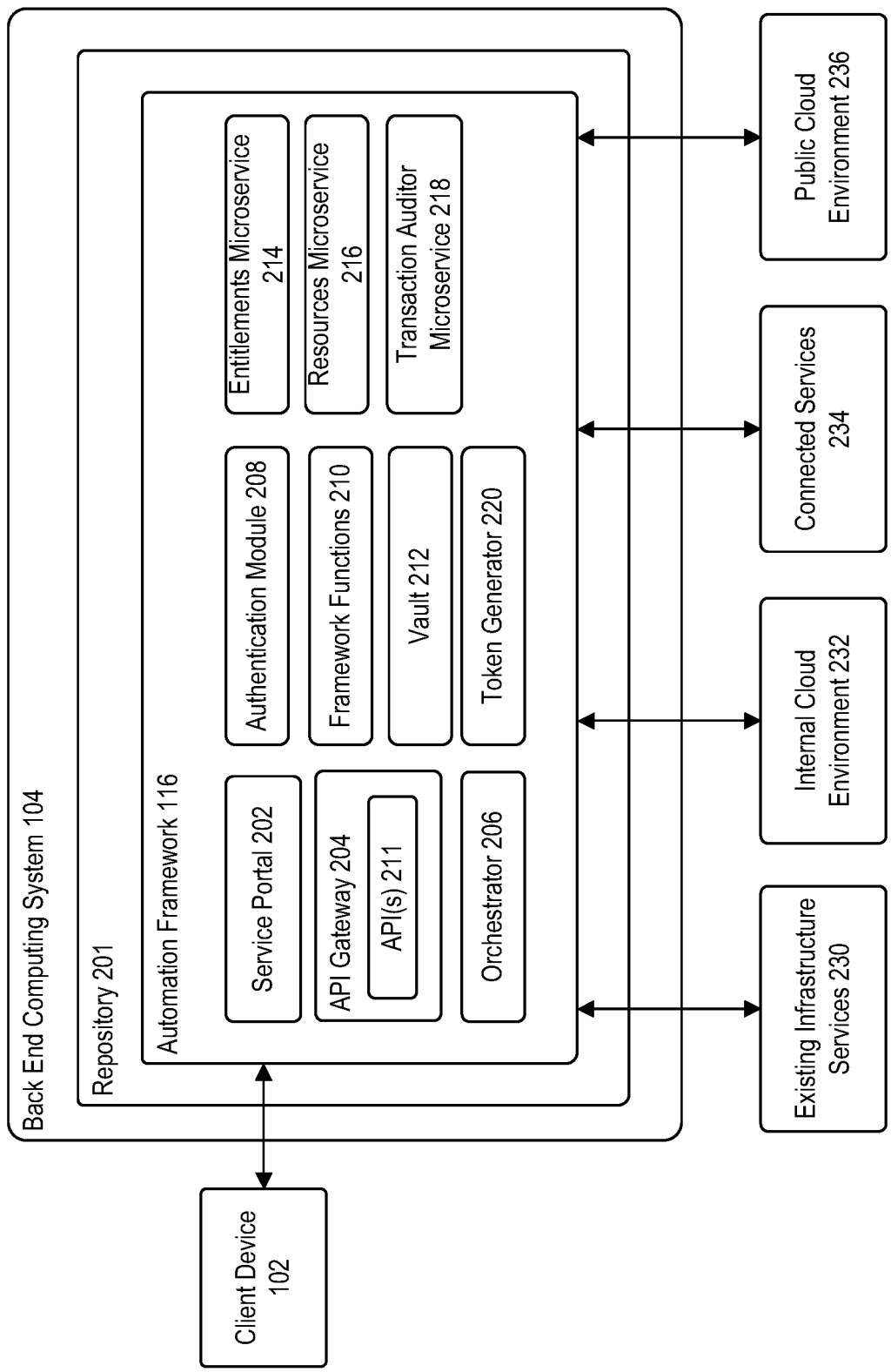
FIG. 2 is a block diagram illustrating back end computing system, according to example embodiments.

FIG. 2 is a block diagram illustrating back end computing system 104, according to example embodiments. As shown, back end computing system 104 may include a repository 201. Repository 201 may be any type of storage unit and/or device for storing data. In some embodiments, repository 201 may include various storage units and/or devices. The various storage units and/or devices may or may not be of the same type or located at the same physical site.

Repository 201 may include automation framework 116. Automation framework 116 may be configured to support large scale collaborative development in a cloud-like way. For example, automation framework 116 may provide users with automated solutions for existing manual processes, which can be consumed by various users or teams in a self-service, automated, and cloud-like fashion. Generally, one of the concerns with developing automated solutions at a large scale is in how to ensure each automation conforms to the same standards for authorization, entitlements, transaction auditing, and change management. Another concern involves determining how consumers adopt these automations in a self service and fully governed way. Automation framework 116 addresses these concerns by providing common mechanisms in support of these critical requirements, thus enabling large scale collaborative development.

Automation framework 116 may include a plurality of modules. For example, automation framework 116 may include one or more of a service portal 202, API gateway 204, orchestrator 206, authentication module 208, entitlements microservice 214, resources microservice 216, and transaction auditor microservice 218. Each of service portal 202, API gateway 204, orchestrator 206, authentication module 208, entitlements microservice 214, resources microservice 216, and transaction auditor microservice 218 may be comprised of one or more software modules. The one or more software modules may be collections of code or instructions stored on a media (e.g., memory of back end computing system 104) that represent a series of machine instructions (e.g., program code) that implements one or more algorithmic steps. Such machine instructions may be the actual computer code the processor of back end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Service portal 202 may be representative of a gateway or portal through which a user or developer via client device 102 may access various services associated with back end computing system 104 so that client device 102 can build or develop an API. For example, a user of client device 102 may access service portal 202 via application 110 executing thereon. In this manner, when a user interacts with application 110 to access functionality of back end computing system 104, client device 102 may interface with service portal 202, which may provide the user with access to functionality of automation framework 116.

In some embodiments, a user may access service portal 202 to develop an API for an entity associated with back end computing system 104. For example, via service portal 202, API developers or users can quickly create APIs or playbooks by calling common functions, managed by framework functions 210, needed by all automations, such as, but not limited to, authentication (authn), authorization (authz), change record (CR) validation, locking functionality, locking and noting transaction, executing orchestrations, and the like. Using a specific example, via service portal 202, a user may develop an API in an API hosting platform (e.g., MuleSoft®, Kong, etc.) or a playbook in Ansible. In some embodiments, framework functions 210 may include functions that allow a user to interact with various endpoints and systems external to automation framework 116. In some embodiments, framework functions 210 may refer to a software library. In some embodiments, framework functions 210 may refer to a microservice-based capability.

In some embodiments, service portal 202 may support various entitlement models that allow a developer or user to easily develop an API or playbook. For example, an entitlement model may provide a user or developer with a template from which to define various entitlements for an API. In this manner, service portal 202 may provide all users or developers with a select set of prerequisites to ensure uniformity or compliance across all APIs developed in service portal 202.

In some embodiments, service portal 202 may provide self-service patching capabilities to end users. For example, business teams may be able to easily and directly manage their own patch activities using automation framework 116 based automation available via an API or through service portal 202. Patching activities may cover, for example, operating system, middleware, and databases in an easy to use and orchestrated fashion.

API gateway 204 may be configured to manage APIs 211 developed by various users. For example, API gateway 204 may act as a gatekeeper to users attempting to access various APIs managed or hosted by automation framework 116. For example, when a user requests to access an API, API gateway 204 may perform one or more operations to determine whether the user requesting access to the API is permitted to access that API.

Entitlements microservice 214 may be configured to manage entitlements associated with one or more APIs. For example, entitlements microservice 214 may store information about automations and user entitlements. Generally, an entitlement, in the context of an API framework, may be associated with the ability to execute an API function, which may or may not execute against a resource. Entitlements microservice 214 may allow those APIs that leverage the API framework to control this ability through various operations. For example, entitlements microservice 214 may utilize active directory data provided by a secure token. Entitlements microservice 214 may compare the token data to data held in an associated entitlements data store in order to grant or deny access for specific API functions based on the API caller's group memberships.

In some embodiments, users may be provided with an easy to use interface for configuring their service's entitlements within automation framework 116 via service portal 202. In this manner, entitlements microservice 214 may allow service owners to directly manage their access to automated capabilities in a self-service fashion.

Resources microservice 216 may be configured to provide APIs with a lightweight source of information about the resources on which they operate. In some embodiments, resources microservice 216 may provide identifiers (e.g., IDs) for API uniform resource locators (URLs). For example, resources microservice 216 may provide appserverruntimeid in the RAML spec/appeserverruntimes/{appserverruntimeId}:. In some embodiments, resources microservice 216 may support identity access and management operations by maintaining a relationship between a resource and the information technology (IT) service that may own it.

In some embodiments, resources microservice 216 may store information on resources to be worked on by automation.

Transaction auditor microservice 218 may be configured to provide a single, easily accessible point for all systems in automation framework 116 to register significant events, linked by a common transaction ID. The types of events recorded in transaction auditor microservice 218 may be largely dependent on the task that the framework enabled automation is carrying out. For example, assume there is a process to build servers and this process is being developed in automation framework 116. In some embodiments, the automation may likely want to register the fact that a request was made at the start of the process. The automation may further want to see if the request succeeded or failed at the end of the process. Events may also include additional information, such as, but not limited to, recording various key milestones associated with the build (e.g., obtained virtual machine, installing operating system, etc.). In some embodiments, transaction auditor microservice 218 may be configured to store data used for logging transaction and audit data.

Token generator 220 may be configured to generate a token for each user. Each respective token may include active directory group membership information for each user. Entitlements microservice 214 may compare token data to data held in an associated data store in order to grant or deny a user access to specific API functions based on the API caller's activity directory group memberships.

Orchestrator 206 may be configured to manage one or more task orchestrations. For example, orchestrator 206 may be configured to manage one or more automations developed by an end user via service portal 202. In some embodiments, orchestrator 206 may be built upon existing orchestration frameworks, such as Ansible, Terraform, and the like.

Authentication module 208 may be configured to manage authentication information associated with back end computing system 104. For example, API gateway 204 may be configured to validate an identity of a user requesting API or automation access via authentication module 208. In some embodiments, authentication module 208 may store a table listing all users with access to automation framework and their associated privileges. In some embodiments, authentication module 208 may further be configured to store group information, such that a team manager or administrator may be able to set privileges on a group level, compared to an individual level. In some embodiments, authentication module 208 may be an internal module configured to manage authentication information. In some embodiments, authentication module 208 may be an external module, such as an Oauth2 server, configured to managed authentication information for automation framework 116.

Vault 212 may be configured to store sensitive information associated with back end computing system 104. For example, vault 212 may be configured to store data, such as, but not limited to, passwords, tokens, encryption keys, permissions, etc., associated with back end computing system 104.

As shown, automation framework 116 may be able to communicate with one or more external systems. For example, automation framework 116 may communicate with existing infrastructure services 230. For example, automation framework 116 may communicate with various endpoint management systems, which may not provide a granular entitlements model on their own, but instead may allow for automated activity to be carried out on managed endpoints. Such endpoint management systems may be exposed as a self-service capability when combined with automation framework 116 and when utilizing entitlements microservice 214. In another example, many different types of existing systems, regardless of their entitlements capabilities, if fronted by automation framework 116, can leverage entitlements microservice 214 as a consistent way of managing access. In another example, automation framework 116 may connect to a change record system to validate changes, hybrid cloud management systems, sources of truth to obtain inventory and service ownership mapping data, and various other systems. In some embodiments, automation framework 116 may also be on the receiving end of communications with various existing services or systems that may want to trigger automation hosting within automation framework 116. For example, an existing alert system may be configured to call an automation hosted on automation framework 116 in order to remediate a detected issue. In some embodiments, exemplary existing infrastructure services 230 may include various integrations with existing services associated with back end computing system 104. In some embodiments, automation framework 116 may be configured to communicate with internal cloud environment 232. Internal cloud environment 232 may be representative of an internal cloud associated with back end computing system 104. In some embodiments, automation framework 116 may be configured to communicate with a public cloud environment 236. Automation framework 116 may also be configured to communicate with one or more connected services 234.

Figure 3:
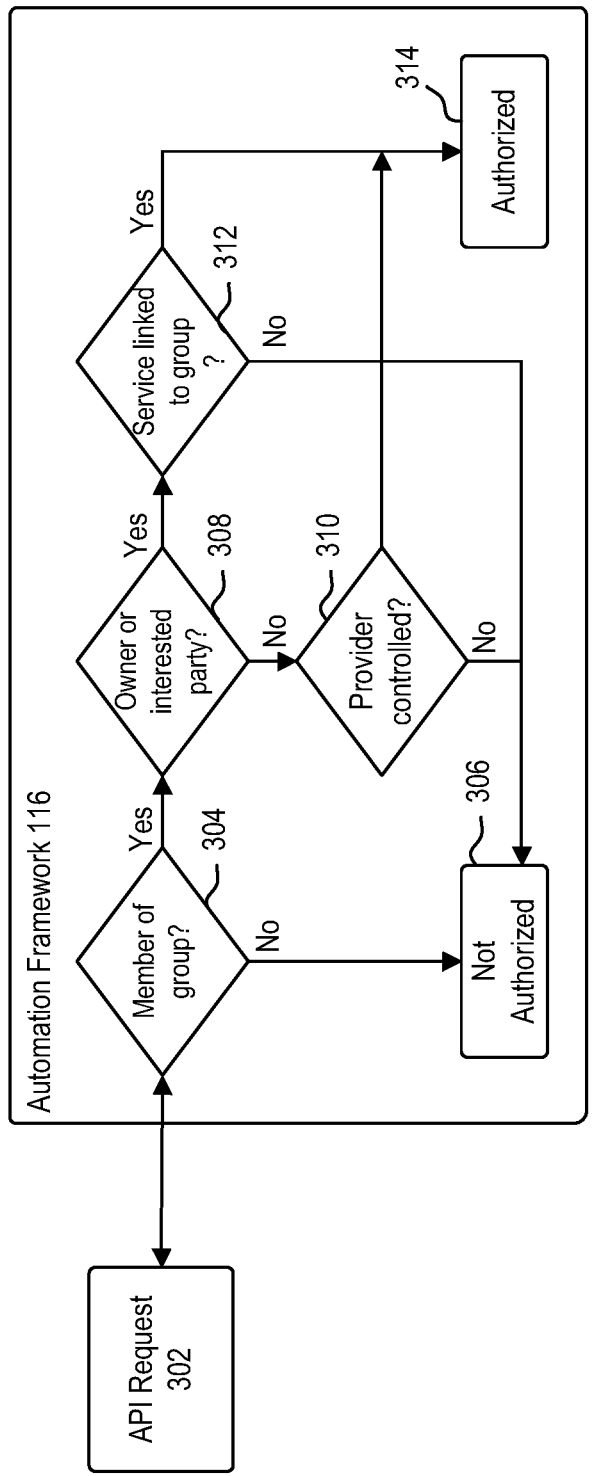
FIG. 3 is a block diagram illustrating automation framework of FIGS. 1 and 2 executing entitlements model, according to example embodiments.

FIG. 3 is a block diagram illustrating automation framework 116 executing entitlements model, according to example embodiments. As shown, automation framework 116 may receive an API request 302. In some embodiments, API request 302 may originate from client device 102. For example, client device 102 may submit an API request 302 that includes a URL, such as "/apil/serverA." API gateway 204 may receive API request 302 from client device 102.

At block 304, API gateway 204 may determine whether the user submitting API request 302 is part of a group that is associated with the requested API. For example, API gateway 204 may determine whether the user submitting API request 302 is part of a group associated with "/apil/". To determine whether the user submitting API request 302 is part of a group associated with the requested API, API gateway 204 may call authentication module 208 to compare information associated with the user's token to a database of permissions. For example, API gateway 204 may call an Oauth2 server to see if the user submitting API request 302 is permitted to access "/apil/".

Using a more specific example, entitlements microservice 214 may analyze portions of the API request. For example, entitlements microservice 214 may parse the following code to determine the group associated with the requesting user:

```
{
    "id" : 137
    "Name" : "CN=HBEU-OS-Support... .",
    "service" : [ {
        "id" : 12,
        "name" : "First Direct"
    } ]
    "defGroup" : 0,
    "role" : [ {
        "id" : 100
        "name" : "DC_OS_Read_Only"
    } ],
```

```
    "groupType" : {
        "id" : 114
        "name" : "OwnerGroup"
    }
}
```

If, at block 304, API gateway 204 determines that the requestor is not part of a group associated with the requested API, then API gateway 204 may determine that the user is not authorized (block 306). In some embodiments, API gateway 204 may provide the user with a message, notifying the user that they are not permitted to access the requested API.

If, however, at block 304, API gateway 204 determines that the requestor is part of the group associated with the requested API, then the operations may proceed to block 308. At block 308, API gateway 204 may determine the type of group associated with the requesting user. For example, API gateway 204 may determine whether the group associated with the user (e.g., Group 1) is a type that is an owner or interested party. Such determination aids in determining how to continue the validation process. For example, when there is a direct owner group, API gateway 204 may check one or more attributes of the group. For example, API gateway 204 may check whether the group is owned by the same person who owns the resource being change, whether the group has a role associated with the request being made, whether the group has a relation to the service, whether the service owns the resource being changed, or the like. In such embodiments, where there is an interested party, API gateway 204 may further check whether the group has a role associated with the request being made, whether the group has a relation to the service, whether the service owns the resource being changed, or the like.

To determine the type of group that Group 1 is, API gateway 204 may call entitlements microservice 214. Entitlements microservice 214 may utilize active directory data to determine the type of group associated with Group 1. Entitlements microservice 214 may compare the token data to data held in an associated entitlements data store in order to grant or deny access for specific API functions based on the API caller's group type.

Using a more specific example, entitlements microservice 214 may analyze portions of the API request. For example, entitlements microservice 214 may parse the following code to determine the group associated with the requesting user:

```
{
"id" : 65
"signature" : "itid-dc-osfuctions:/totalRAM/{machine_name}:GET",
"isEntitlement" : true,
"isHidden" : false,
"role" : [ {
"id" : 100,
"name" : "DC_OS_Read_Only"
}
```

If at block 308, API gateway 204 determine that Group 1's type is not of an owner or interested party, then API gateway 204 may proceed to block 310. At block 310, API gateway 204 may determine whether Group 1's type is provider controlled. For example, the functionality may not be suitable for self-service by service owners. If, for example, there was an automation that could act on the virtualization layer (e.g., a layer below the resources owned by service owners), this automation may likely be restricted to an administration team whose only job may be to manage this function. In such cases, that type of direct, provider controlled entitlement (e.g., the provider of said function allows only this group access to this function) may be required and supported by automation framework 116. If, at block 310, API gateway determines that Group 1's type is provider controlled, then API gateway 204 may determine that the user is not authorized (block 306).

If, however, at block 310, API gateway determines that Group 1's type is provider controlled, then API gateway 204 may authorize the API request (block 314).

Referring back to block 308, if, at block 308, API gateway 204 determines that Group 1's type is an owner or interested party, then API gateway 204 may proceed to block 312. At block 312, API gateway 204 may determine whether the specified server is associated with the services linked with Group 1. For example, API gateway 204 may determine whether "serverA" is associated with the services linked with Group 1. For example, in some embodiments, a service owner may manage entitlements on resources for which they are directly responsible. This may mean that the service owner may assign specific privileges on groups that they may own. For example, a service owner may have a team of experienced Unix operators and may grant this group of people access to Unix automation on automation framework 116.

If, at block 312, API gateway 204 determines that the server is not associated with the services linked with Group 1, then API gateway 204 may determine that the use is not authorized (block 306). If, however, at block 312, API gateway 204 determines that the server is associated with the services linked with Group 1, then API gateway 204 may authorize the API request (block 314).

Using a more specific example, resources microservice 216 may analyze portions of the API request to determine whether the server is associated with services linked with Group 1. For example, resources microservice 216 may parse the following code to determine the group associated with the requesting user:

```
{
    "id" : 240
    "name: "gbl1110002",
    "changeControled" : 1,
    "childterms" : [ ] ,
    "itemType" : {
        "id" : 151,
        "name" : "Linux Server"
    },
    "relationType" : {
    "id" : 152,
    "name" : "None"
}, "service" : [ {
    "id" : 74,
    "service_id" : 12
    } ]
}
```

Figure 4:
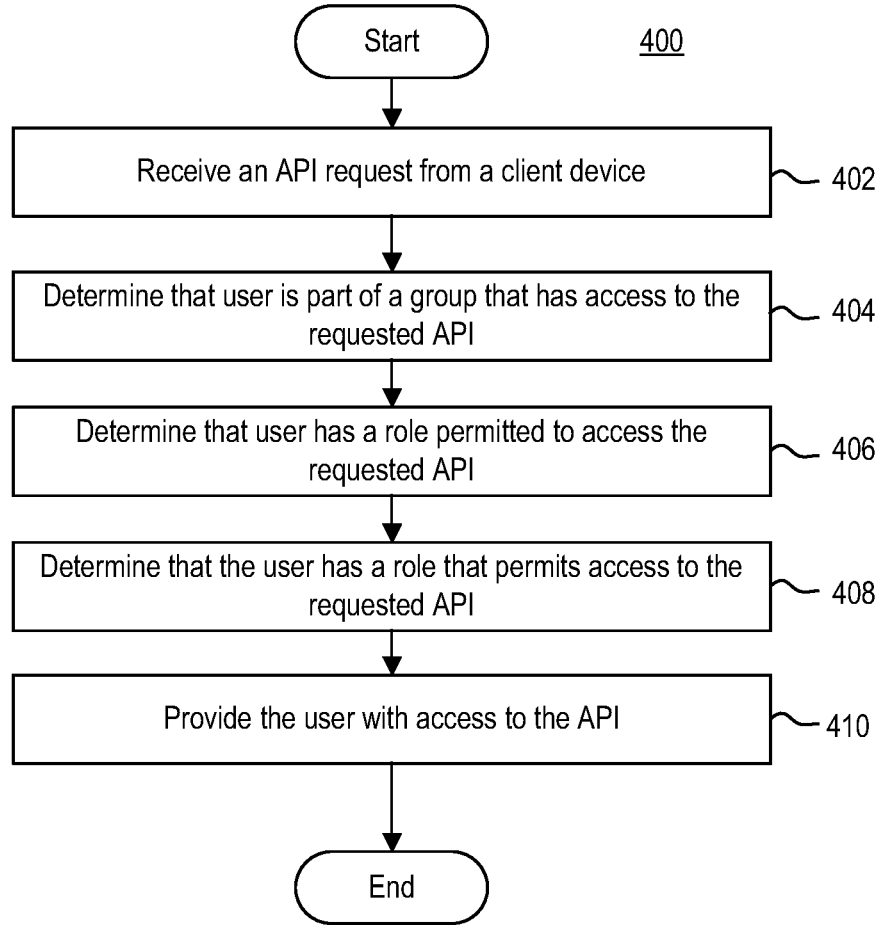
FIG. 4 is a flow diagram illustrating a method of managing an API request, according to example embodiments.

FIG. 4 is a flow diagram illustrating a method 400 of managing an API request, according to example embodiments. Method 400 may begin at step 402.

At step 402, back end computing system 104 may receive an API request from client device 102. In some embodiments, back end computing system 104 may receive the API request from client device 102 via application 110 executing thereon. In some embodiments, the API request may include one or more sets of information associated therewith. For example, the API request may include token information for the user initiating the request that uniquely identifies the user.

At step 404, back end computing system 104 may parse the API request to determine whether the requesting user is permitted access to the requested API. For example, API gateway 204 may determine whether the user submitting the API request is part of a group associated with requested API. To determine whether the user submitting the API request is part of a group associated with the requested API, API gateway 204 may call entitlements microservice 214 to compare information associated with the user's token to information in the API that defines a group of users having access to the API. For example, API gateway 204 may determine whether the requesting user is a member of a group that has access to the requested API.

At step 406, after determining that the user is part of a group that has access to the requested API, back end computing system 104 may determine whether the user has a role that permits them to access the API. For example, API gateway 204 may call entitlements microservice 214 that may parse an API signature associated with the requested API. The API signature may include information, such as, roles that may be permitted to access the requested API. Entitlements microservice 214 may determine that the user has a role permitted to access the requested API by comparing role information in the user's token to role information in the API signature.

At step 408, after determining that the user has a role that permits them to access the requested API, back end computing system 104 may determine the service associated with the API request. For example, API gateway 204 may call resources microservice 216 configured to compare information in the API request to various resources or services managed by resources microservice 216. Using a specific example, resources microservice 216 may compare a resource item ID in the API signature to determine which service or services are associated with the API request.

At step 410, API gateway 204 may provide the user with access to the API. For example, based on the operations associated with steps 404-408, API gateway 204 may provide the user with access to a service or services associated with the API request.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 3 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 which can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks.

Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. An automation framework system, comprising:
    a service portal configured to provide access to automation functionality of the automation framework system, the service portal configured to provide entitlement models for generating an application programming interface (API) or automation;
    an API gateway configured to intercept API requests from a client device, the API gateway configured to grant or reject the API requests based on each requested API and information about a user associated with the client device;
    an entitlements microservice configured to determine whether the user of the client device is permitted to access the API based on group information associated with the client device; and
    a resources microservice configured to manage resources associated with each API request.

2. The automation framework system of claim 1, further comprising:

an authentication module configured to authenticate an identification token provided by the client device with a respective API request.

3. The automation framework system of claim 1, further comprising:
framework functions comprising a plurality of functions or microservices for creating the API or the automation.

4. The automation framework system of claim 1, further comprising:
a token generator configured to create an identification token for the user of the client device.

5. The automation framework system of claim 1, further comprising:
a transaction auditor microservice configured to register API events or automation events based on a transaction identifier of each API event or automation event.

6. The automation framework system of claim 1, wherein the entitlements microservice is configured to grant or reject the API requests based on each requested API and information about the user associated with the client device by comparing group information in an identification token associated with the user with stored group information in an API signature of an API associated with an API request.

7. The automation framework system of claim 6, wherein the entitlements microservice is further configured to compare role information in the identification token to stored role information in the API signature.

8. The automation framework system of claim 6, wherein the resources microservice is configured to manage the resources associated with each API request by identifying a resource item identifier in the API signature.

9. The automation framework system of claim 1, further comprising:
an authentication module configured to manage group information for users associated with the automation framework system.

10. An automation framework system, comprising:
an application programming interface (API) gateway configured to intercept API requests from a client device, the API gateway configured to grant or reject the API requests based on each requested API and information about a user associated with the client device;
an entitlements microservice configured to determine whether the user of the client device is permitted to access the API based on group information associated with the client device; and
a resources microservice configured to manage resources associated with each API request.

11. The automation framework system of claim 10, further comprising:
an authentication module configured to authenticate an identification token provided by the client device with a respective API request.

12. The automation framework system of claim 10, further comprising:
framework functions comprising a plurality of functions or microservices for creating the API or the automation.

13. The automation framework system of claim 10, further comprising:
a token generator configured to create an identification token for the user of the client device.

14. The automation framework system of claim 10, further comprising:
a transaction auditor microservice configured to register API events or automation events based on a transaction identifier of each API event or automation event.

15. The automation framework system of claim 10, wherein the entitlements microservice is configured to grant or reject the API requests based on each requested API and information about the user the associated with client device by comparing group information in an identification token associated with the user with stored group information in an API signature of an API associated with an API request.

16. The automation framework system of claim 15, wherein the entitlements microservice is further configured to compare role information in the identification token to stored role information in the API signature.

17. The automation framework system of claim 15, wherein the resources microservice is configured to manage the resources associated with each API request by identifying a resource item identifier in the API signature.

18. A method, comprising:
intercepting, by an application programming interface (API) gateway, an API request originating from a client device, the API request comprising a token identifier corresponding to a user of the client device and an API identifier associated with an API of the API request;
determining, by an entitlements microservice, that the user is in a group of users that is permitted to access the API;
determining, by the entitlements microservice, that the user has a role that is permitted to access the API;
identifying, by a resources microservice, one or more services associated with the API in the API request; and
granting, by the API gateway, the user with access to the API.

19. The method of claim 18, wherein determining, by the entitlements microservice, that the user is in the group of users that is permitted to access the API comprises:
comparing group information in the token identifier to stored group information in an API signature associated with the API.

20. The method of claim 18, wherein determining, by the entitlements microservice, that the user has the role that is permitted to access the API comprises:
comparing role information in the token identifier to stored role information in an API signature associated with the API.

* * * * *